US010972369B1

(12) United States Patent
Passaglia et al.

(10) Patent No.: US 10,972,369 B1
(45) Date of Patent: Apr. 6, 2021

(54) CLOUD-BASED DEVICE DISCOVERY

(71) Applicant: Amazon Technologies, Inc., Seattle, WA (US)

(72) Inventors: Abraham M. Passaglia, Seattle, WA (US); Nadir Kiyanclar, Seattle, WA (US); Zaka Ur Rehman Ashraf, Pleasanton, CA (US); Edward J. Gayles, Tracy, CA (US); Samuel S. Gigliotti, Seattle, WA (US); Brett N. Lynnes, San Jose, CA (US); John L. Miller, Seattle, WA (US); Ruoruo Zhang, Santa Clara, CA (US); Rajasimman Madhivanan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/247,290

(22) Filed: Jan. 14, 2019

Related U.S. Application Data

(62) Division of application No. 14/096,736, filed on Dec. 4, 2013, now Pat. No. 10,181,985.

(51) Int. Cl.
*H04L 29/08* (2006.01)
*H04L 12/26* (2006.01)

(52) U.S. Cl.
CPC .......... *H04L 43/04* (2013.01); *H04L 67/1061* (2013.01)

(58) Field of Classification Search
CPC ........................... H04L 43/04; H04L 67/1061
USPC ....................................................... 709/224
See application file for complete search history.

(56) References Cited

U.S. PATENT DOCUMENTS

| 7,162,422 | B1 | 1/2007 | Bennett |
| 7,554,968 | B1 | 6/2009 | Modarressi et al. |
| 7,792,906 | B2 | 9/2010 | Garcia-Martin et al. |
| 7,836,484 | B2 | 11/2010 | Pardo-Blazquez et al. |
| 8,559,335 | B2 | 10/2013 | Berman |
| 2002/0058515 | A1 | 5/2002 | Holler et al. |
| 2005/0153688 | A1 | 7/2005 | Burkhart et al. |
| 2005/0154985 | A1 | 7/2005 | Burkhart et al. |
| 2005/0193199 | A1 | 9/2005 | Asokan et al. |
| 2007/0226774 | A1 | 9/2007 | Pardo-Blazquez et al. |
| 2008/0196109 | A1 | 8/2008 | Matsuzaki et al. |
| 2009/0128852 | A1 | 5/2009 | Fujishita |
| 2009/0151006 | A1 | 6/2009 | Saeki et al. |

(Continued)

OTHER PUBLICATIONS

Office action for U.S. Appl. No. 14/096,736, dated Dec. 9, 2016, Passaglia et al., "Cloud-Based Device Discovery", 7 pages.

(Continued)

*Primary Examiner* — Glenford J Madamba
(74) *Attorney, Agent, or Firm* — Lee & Hayes, P.C.

(57) ABSTRACT

Describe herein are techniques for providing cloud-based discovery. For example, a device may be configured to provide device registration and de-registration notifications to a cloud-based discovery service. The cloud-based discovery service may be configured to respond to discovery request by identifying registered devices that meet the criteria of the discovery request. The cloud-based discovery service may also be configured to provide endpoint information associated with registered devices in response to the discovery request, such that a device is able to utilize the endpoint information to connect with one or more of the registered devices.

20 Claims, 9 Drawing Sheets

(56) References Cited

U.S. PATENT DOCUMENTS

| | | |
|---|---|---|
| 2011/0009086 A1 | 1/2011 | Poremba et al. |
| 2013/0151111 A1 | 6/2013 | Skelton |
| 2013/0188515 A1 | 7/2013 | Pinheiro et al. |
| 2014/0064738 A1 | 3/2014 | Chen et al. |
| 2014/0066062 A1 | 3/2014 | Chen et al. |
| 2014/0085059 A1 | 3/2014 | Chen et al. |
| 2014/0192739 A1 | 7/2014 | Liao |
| 2015/0019714 A1* | 1/2015 | Shaashua ................ H04W 4/70 709/224 |
| 2016/0227371 A1* | 8/2016 | Wang ..................... H04W 4/70 |
| 2017/0063566 A1* | 3/2017 | Seminario ........... H04L 12/2816 |
| 2019/0222426 A1* | 7/2019 | Rahman ................ H04L 9/3268 |
| 2019/0394312 A1* | 12/2019 | Bhagwat ................ H04L 69/24 |

OTHER PUBLICATIONS

Office action for U.S. Appl. No. 14/096,736, dated May 17, 2016, Passaglia et al., "Cloud-Based Device Discovery", 5 pages.
Office action for U.S. Appl. No. 14/096,736, dated Aug. 21, 2017, Passaglia et al., "Cloud-Based Device Discovery", 19 pages.

* cited by examiner

CLOUD-BASED DEVICE DISCOVERY

CROSS REFERENCE TO RELATED APPLICATIONS

This application is a divisional of U.S. patent application Ser. No. 14/096,736, filed on Dec. 4, 2013, which is incorporated herein by reference.

BACKGROUND

Many new homes and offices now include appliances and computing devices, which operate in combination or may be controlled by one or more master devices. For devices to operate in combination, typically, each device is made aware of the capabilities of the other devices in the household via local discovery protocols. Typically, in local discovery techniques one of the devices broadcasts or multicasts a list of device capabilities and a device identifier over the local network, while the other devices of the household listen for the broadcast. If a listening device desires to utilize one of the capabilities, the listening device issues a request using a device identifier and the two devices establish a local or device-to-device communication channel.

However, the number and types of discoverable devices has and continues to significantly expand. Unfortunately, this increase in the number of discoverable devices in a user's home or office has resulted in an increased network burden on the local router or gateway, as the increasing number of broadcasting and listening devices consumes more and more of the local bandwidth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
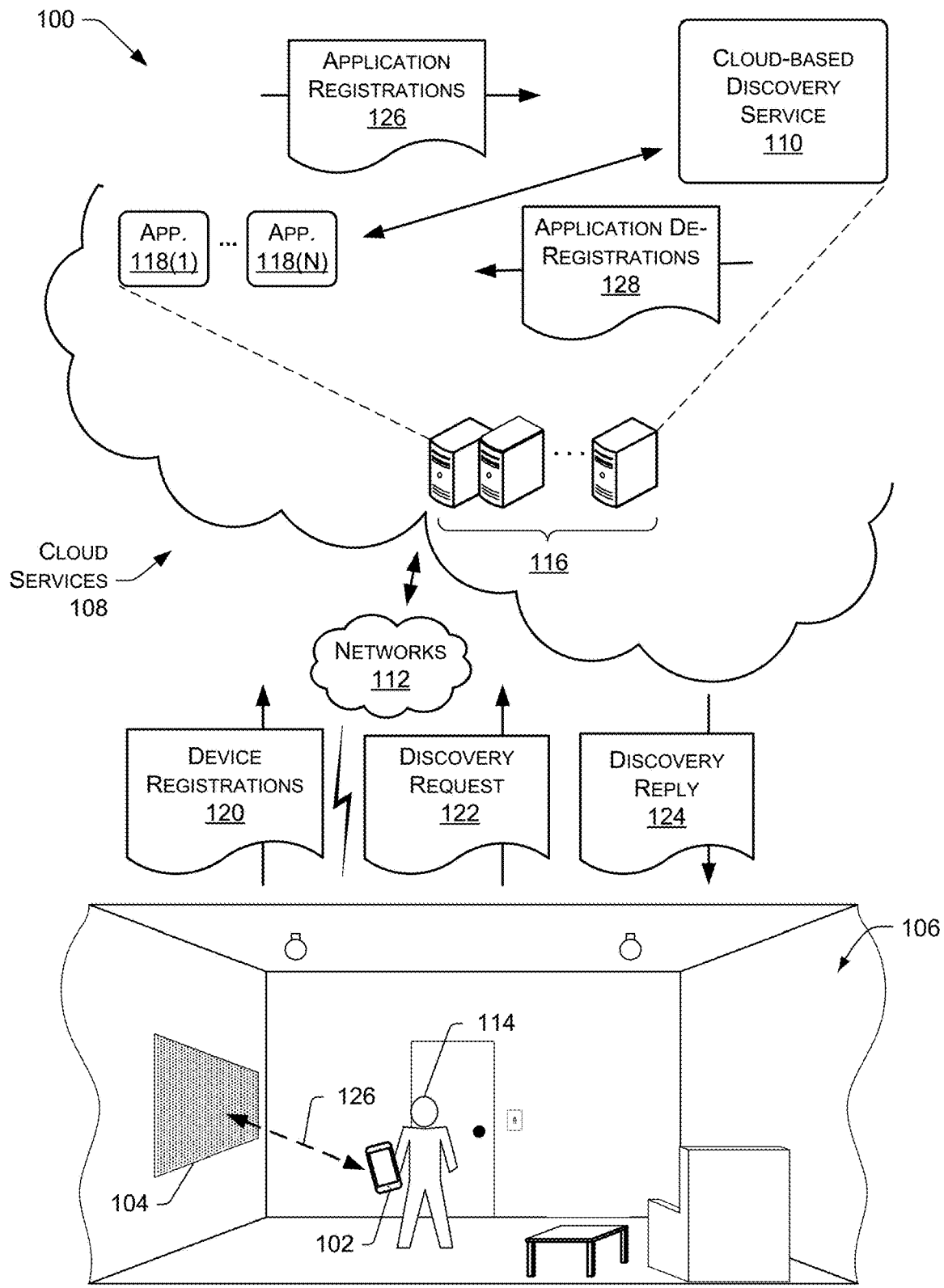
FIG. 1 illustrates an example environment including devices physically situated in the home and communicatively coupled to a cloud-based discovery service.

This disclosure includes techniques and implementations to improve performance of home and office systems. In particular, this disclosure describes ways to improve device and application discovery (or pairing) and device-to-device communication. For instance, many devices utilized in homes and offices are configured with one or more capabilities that may be utilized by other devices through device-to-device communication. However, as the number of devices in a particular home or office configured to share device capabilities increases, the strain on the local network may become significant, as each device broadcasts capabilities and listens for other broadcasting devices.

The techniques described herein achieve improve device and application discovery through the use of network-accessible or cloud-based services. For example, a cloud-based discovery service may be utilized to register devices and device capabilities, as well as applications and application services and to respond to discovery requests. In other examples, a network-accessible or cloud-based relay service may be utilized to provide data transfer between devices of the system, for instance, when local network communication or device-to-device communication is unavailable or when the service requested is a cloud-based application.

In some implementations, devices are able to register with a cloud-based discovery service. For example, when a device is turned on, the device may provide a device registration notification to the cloud-based discovery service. The device registration notification may include one or more device identifiers (e.g., a device ID), a list of capabilities associated with the device that may be accessed by other devices or systems (e.g., video display, text-to-speech converter, word processing application, etc.), and endpoint information (e.g., information that may be used to connect to or establish a communication channel with the device).

Once the device registration notification is received by the cloud-based discovery service, the cloud-based discovery service registers the device by adding the device to a list of registered devices. In some specific implementations, the cloud-based discovery service may generate a device list for each capability. For example, if device A, device B, and device D have text-to-speech capabilities, the cloud-based discovery service may group devices A, B, and D in a first group, while if device C and device D have speech-to-text capabilities, the cloud-based discovery service may include devices C and D in a second group. In other implementations, each device may have a sub-list or group of capabilities.

In some cases, the cloud-based discovery service may group devices and/or capabilities based on additional information, such as physical location (e.g., list of devices/capabilities available in a home or office), common network, authorized users or permissions (e.g., some capabilities may be available on the devices in household but the requesting user is a child and the selected capabilities may not be available if the capability is not child friendly), one or more arbitrary security group (e.g., a group created by the user), one or more account (e.g., both devices are registered with the same user account), etc.

In some particular implementations, the devices and/or capabilities registered with the cloud-based discovery service may also include cloud-based applications and services. For example, the user may have one or more subscription based services (e.g., streaming videos or music services), which the cloud-based discovery service may include in the list of registered devices.

In addition to device registration notifications, each device may provide the cloud-based discovery service with a discovery request. The discovery request may be for a list of devices, applications, capabilities and/or services available through the cloud-based discovery service, for a list of devices with a specific capability or service, or for a list of devices or applications available in a household, associated with a user account, or within a certain distance from the requesting device. The discovery request may be a user generated request (e.g., the user causes the device to issue the discovery request) or, in some cases, the discovery request may be generated automatically by the device, for example, in response to the user opening or selecting a specific application.

In response to receiving the discovery request, the cloud-based discovery service generates a discovery reply. The discovery reply may include a list of device identifiers and device capabilities corresponding to devices and capabilities meeting a criteria provided in the discovery request. For example, the discovery reply may return all devices having a display larger than 55 inches. In some implementations, the list may include a device identifier, such as "Samsung® 60 Smart TV," followed by the service, such as "1920×1080 pixel video display." The device identifier may be provided first, as the device identifiers are generally more meaningful to a user than the description of the capabilities. The discovery reply also includes information related to at least one endpoint for connecting to each of the devices/applications included in the discovery reply.

In some implementations, the cloud-based discovery service may rank the devices returned in response to the discovery request. For instance, the cloud-based discovery services may rank the devices based on various criteria, such as historical use, user information, account information, type of device requesting the services, among others. In one particular example, the cloud-based discovery service may receive a request for a video streaming service and return Netflix® as the first service on the list, as the cloud-based discovery service may know that Netflix® is the most commonly selected service when the request is received from the specific device or user.

Once the discovery service reply is received at the requesting device, the user may select one of the capabilities or services to utilize. When the selection is received, the requesting device extracts the endpoint information from the discovery reply and selects a transport for communicating with the selected device/application. For example, the requesting device may contact a source, such as a router or gateway that is able to initiate communication between both the devices. In other examples, the requesting device may connect to the selected device over a device-to-device communication channel, such as Bluetooth®, or via one or more of cloud-based relay services. For instance, the cloud-based relay services may be used to transfer data between the requesting device and the selected device when the devices are not proximal to each other.

Devices may also de-register from the cloud-based discovery service. For example, when a device is turned off, the capabilities of the device may no longer be available. However, if the device remains registered with the cloud-based discovery service, the cloud-based discovery service may return the device and corresponding capabilities in response to a discovery request. Therefore, the devices of the system may be configured to provide a de-registration notification to the cloud-based discovery service to indicate that some or all of the capabilities of the device are no longer available.

The de-registration notification may indicate that the device is changing state (e.g., shutting down, going idle, or the user may have placed the device in a do not disturb state). For example, if the device is shutting down the de-registration notification may indicate that the device and all capabilities or services should be de-registered from the cloud-based discovery service. Alternatively, if the device is going idle or into a low power mode, the de-registration notification may indicate that the device may remain registered but only the capabilities associated with background operations may remain available.

FIG. 1 illustrates an example environment 100 including devices 102 and 104 physically situated in the home 106 and communicatively coupled to one or more cloud services 108 including the cloud-based discovery service 110 via one or more networks 112. In the illustrated implementation, the device 102 is a smart phone in active use by user 114 and device 104 is a television including a display that may be utilized as a secondary display for the smart phone 102. While devices 102 and 104 are illustrated as a smart phone and television, it should be understood that devices 102 and 104 may be any type of device including a network interface. In some examples, the devices 102 and 104 may be a desktop computer, tablet computer, electronic book reader device, household appliance, cellular phone, among others.

The devices 102 and 104 may be communicatively coupled to the networks 112 and/or each other via wired technologies (e.g., wires, USB, fiber optic cable, etc.), wireless technologies (e.g., RF, cellular, satellite, Bluetooth, etc.), or other connection technologies. The networks 112 are representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth®, etc.), and/or other connection technologies. The networks 112 carry data between the cloud services 108 and the devices 102 and 104. In some implementations, the devices 102 and 104 may be connected to the network 112 via a gateway, router, or other type of master device, which facilitates communication between the devices 102, 104, and the network 112.

The cloud services 108 generally refer to a network accessible platform implemented as a computing infrastructure of processors, storage, software, data access, and so forth that is maintained and accessible via a network such as the Internet. The cloud services 108 do not require end-user knowledge of the physical location and configuration of the system that delivers the services. Common expressions associated with cloud services include "on-demand computing," "software as a service (SaaS)," "platform computing," "network accessible platform" and so forth.

The cloud services 108 include the cloud-based discovery service 110, which may be implemented by one or more servers 116. Generally, the cloud-based discovery service 110 stores lists of devices and capabilities that are available for use upon request by the devices 102 and 104. In some implementations, the cloud-based discovery service 110 may also include list of one or more applications and services, illustrated as applications 118(1)-(N), which may be returned in response to a discovery request. For example, the applications 118(1)-(N) may include cloud-based services, such as games, music, videos and/or other content streaming or download services, cloud-based storage services, online shopping or retail services, among others.

The servers 116 may be owned by a single entity and co-located at a common data center or located at separate data centers. Alternatively, the servers 116 may be owned and operated by independent entities at separate locations. The servers 116 may be further arranged in any number of ways, such as server farms, stacks, and the like that are commonly used in data centers.

In the illustrated example, the devices 102 and 104 are configured to provide device registration notifications 120 to the cloud-based discovery service 110. For example, the device 102 (the smart phone) may register with the cloud-based discovery service 110 by notifying the cloud-based discovery service 110 of a list of software applications currently installed, while the device 104 (the television) may register the display capabilities. The registration notifications 120 also include device identifiers and device endpoint information (e.g., information that may be used to connect to the device).

The cloud-based discovery service 110 receives the device registration notification 120 from both the devices 102 and 104 and adds the devices 102 and 104 and capabilities indicated in the registration notification 120 to the list of available devices and/or capabilities. In some instances, the cloud-based discovery service 110 may group or correlate the devices 102 and 104 into a household group based on additional information known about the devices 102 and 104 or additional information provided in the device registration notifications 120. For example, if the device registration notifications 120 are received by the cloud-based discovery service 110 via the same router, gateway, and/or other network device, the cloud-based discovery service 110 may assume the devices 102 and 104 belong to the same household and group the devices 102 and 104. In another example, the cloud-based discovery service 110 may group the devices based on account information, for instance, if both devices 102 and 104 are registered or owned under the same user account, the cloud-based discovery service 110 may group the devices 102 and 104 into a set of devices available to under the user account.

In an example, the user 114 may desire to utilize the display of the device 104 (the television) to present information available on the device 102 (the smart phone). In this example, the user 114 may cause the device 102 to issue a discovery request 122 to the cloud-based discovery service 110. The discovery request 122 may be a specific request, for example, a request for a list of all devices with an available display. In the alternative, the discovery request 122 may be more generic, for instance, a request for all devices and services associated with the household or home 106.

In response to receiving the discovery request 122, the cloud-based discovery service 110 generates a discovery reply 124. The discovery reply includes a list of devices, device capabilities that are available to the requesting device 102 and meet the criteria of the discovery request 122. For example, in response to a discovery request 122 requesting available displays within the home 106, the cloud-based discovery service 110 may generate and provide the device 102 with a discovery reply 124 including a device identifier for the device 104 (e.g., the television or "Samsung® Smart Television"), the display capabilities (e.g., "55 inch 1920× 1080 pixel high definition display"), and one or more endpoints for accessing the device 104 (e.g., information for establishing a device-to-device connection, information to establish a connection over the home's 106 local Wifi network, and/or information to relay the data over one or more of the cloud-services 108).

In the illustrated example, the device 102 receives the discovery reply 124 and the user 114 selects the display of the device 104 from the list of available devices and capabilities returned as part of the discovery reply 124. In this instance, the user 114 may choose to establish a device-to-device communication channel between devices 102 and 104. Thus, the device 102 extracts the endpoint information from the discovery reply 124 associated with the device-to-device connection and establishes communication channel 126.

Utilizing communication channel 126, the much larger television display of device 104 may be used to display information and data associated with the device 102. For example, the user 114 may stream a video from a video source located in the cloud to device 102 and then watch the video on the display of device 104. In the illustrated example, the user 114 is utilizing the display capabilities of device 104 in conjunction with device 102. However, it should be understood that the device 102 may connect to various other devices and/or utilize various other device capabilities, services, and/or functionality via the cloud-based discovery service 110.

In some implementations, the applications 118(1)-(N) may be configured to provide application registrations 126 to the cloud-based discovery service 110. The application registrations 126 may include an application identifier, a list of services provided by the registering application and information related to one or more endpoint for connecting with the registering application. For example, the user may have an account with Netflix® and Netflix® may be configured to register with the cloud-based discovery service 110 and provide a list of movies or television shows that may be streamed to devices associated with the user.

Similarly, the applications 118(1)-(N) may be configured to provide an application de-registration 128 to remove the application from the list of applications and/or devices available via the cloud-based discovery service 110. For instance, in the current example, if the user canceled their account with Netflix® and in response, Netflix® may generate an application de-registration notification 128 to cause the cloud-based discovery service 110 to remove Netflix® form the list of available applications.

Figure 2:
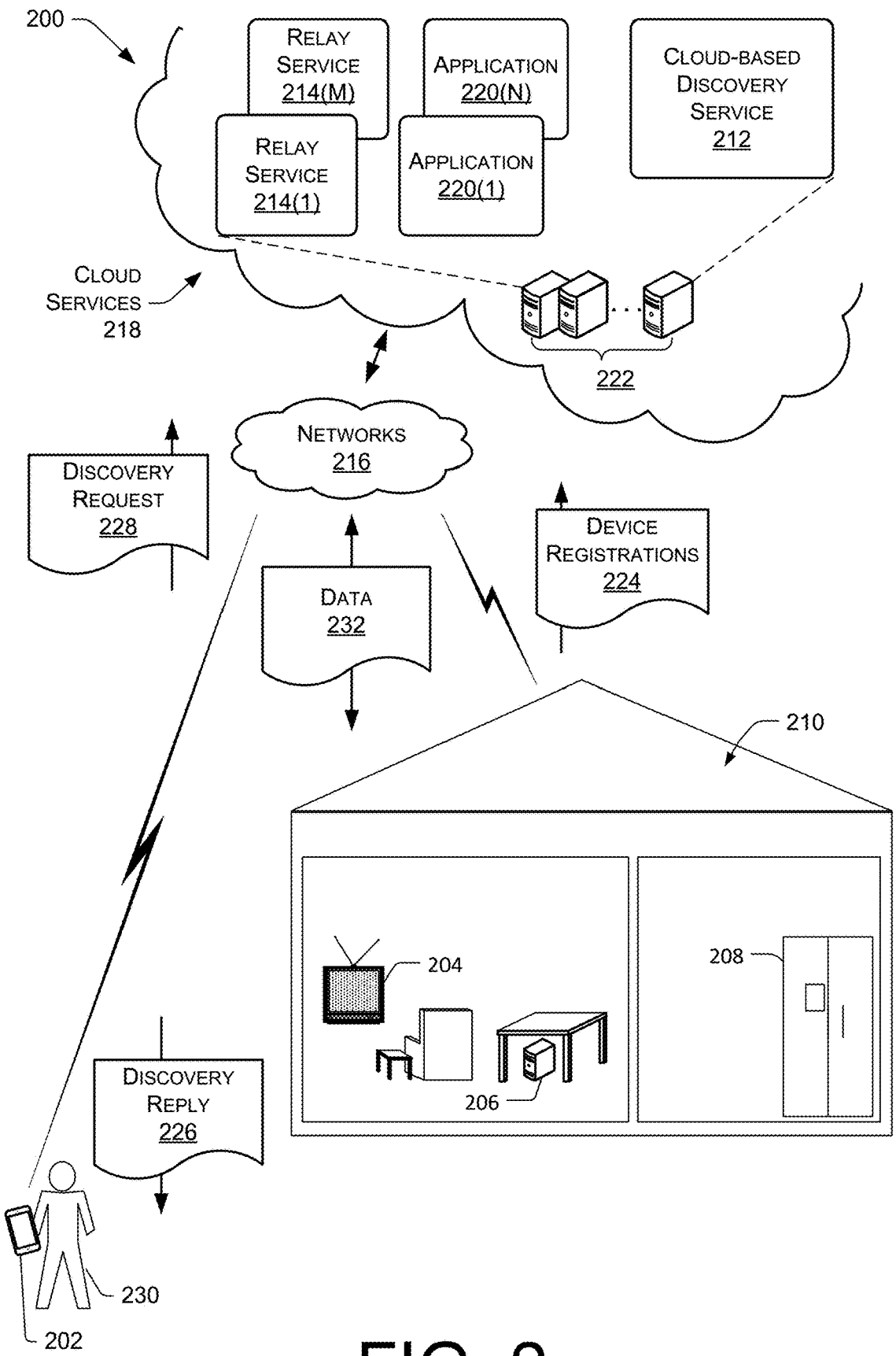
FIG. 2 illustrates an example environment including multiple computing devices physically situated both inside and outside of the home and communicatively coupled to the cloud-based discovery service.

FIG. 2 illustrates an example environment 200 including multiple devices 202, 204, 206, and 208 physically situated both inside and outside of the home 210 and communicatively coupled to the cloud-based discovery service 212. In the illustrated example, the device 202 is a smart phone, the device 204 is a television, the device 206 is a home computer, and the device 208 is a refrigerator. However, the devices 202-208 may be a variety of devices, such as a cell phone, smart phone, tablet, general purpose computer, electronic book reader, among other type of known electronic devices.

The devices 202-208 may be configured to communicate with each other directly, via one or more wireless access points or a master device as part of an ad-hoc or home network system, and/or via one or more cloud-based relay services 214(1)-(M) over one or more networks 216. The communication interfaces of the devices 202-208 may support both wired and wireless connection to various networks, such as cellular networks, radio, WiFi networks, short-range or near-field networks (e.g., Bluetooth®), infrared signals, local area networks, wide area networks, the Internet, and so forth.

The cloud services 218, generally includes, the cloud-based discovery service 212 for registering and de-registering devices, capabilities, and services, applications 220(1)-(N) that may be utilized as services by the devices 202-208, and relay services 214(1)-(M) that may be utilized as one type of endpoint for establishing communication channels between the devices 202-208. In general, the cloud services 218 are implemented on one or more servers 222. The servers 222 may be owned by a single entity and collocated at a common data center or located at separate data centers. Alternatively, the servers 222 may be owned and operated by independent entities at separate locations. The servers 222 may be further arranged in any number of ways, such as server farms, stacks, and the like that are commonly used in data centers.

As describe above, each of the devices 202-208 is configure to provide a device registration notification 224 to the cloud-based discovery services 212. The cloud-based discovery service 212 may then return the device identifiers, lists or indications of device capabilities, and information related to the device endpoints associated with the devices 202-208 as part of a discovery reply 226, in response to receiving a discovery request 228. The discovery request 228 may be a specific request, for example, a request for a list of all devices associated with a household or user account. Alternatively, the discovery request 228 may be more genetic, for instance, a request for all available devices. The discovery reply 226 may include a list of devices or applications, capabilities and/or services, and information related to device or application endpoints. For example, the discovery reply 226 may including a device identifier (e.g., television or "Samsung® Smart Television"), the capabilities (e.g., "55 inch 1920×1080 pixel high definition display", "65 decibel surround sound speaker system", etc.), and one or more endpoints (e.g., information for establishing a device-to-device connection, information to establish a connection over the home's 210 local Wifi network, and/or information to relay the data over one or more of the cloud-services relay services 214(1)-(M)).

In the illustrated example, a user 230 is carrying the device 202 outside of the home 210. In this example, assume the user 230 utilizes device 202 to issue a discovery request 228 to the discovery services 212. In an example, the discovery request 228 may include a request for devices and capabilities available based on the household or home 210 group. In response, the cloud-based discovery service 212 may generate a discovery reply 226 including a list of the applications 220(1)-(N) with a sub-list of the services for each of the applications 220(1)-(N), a list of the devices 204-208 with sub-lists for each device 204-208 including the capabilities of the corresponding device. Once generated, the discovery reply 226 may be provided to the device 202.

For the present example, assume the user 230 is attempting to stream music that the user 230 has stored on the device 206 (the home desktop computer) to the device 202 (the user's smart phone). Using the device 202, the user 230 may select the device 206 from the list of devices, select a music application from the list of capabilities associated with device 206, and select an endpoint to establish a communication channel with the device 206. In this instance, the device-to-device endpoint and the home WiFi endpoint may be disabled, as the user 230 and the device 202 are not present in the home 210. However, the user 230 may still select one of the cloud-based relay services 214(1)-(M) as the endpoint. In this way, the user 230 is able to access capabilities of devices that are remote from the user's location, which are not typically available via local discovery techniques.

Once the relay services 214(1)-(M) are selected as the desired endpoint, the device 206 executes the music application and streams music to the device 202 via the relay services 214(1)-(M). In this manner, the cloud-based discovery service 212 and the cloud-based relay services 214(1)-(M) allow data 232 (e.g., the music) to transfer to and from the device 202 and device 206. In other examples, the user 230 may access other devices using the cloud-based discovery service 212 and the cloud-based relay services 214(1)-(M). For instance, the user 230 may adjust the temperature of device 208 (the refrigerator), record one or more television shows using device 204 (the television or set-top-box), and/or access a presentation stored on the device 206 (the desktop computer.

In some cases, the selected one of the relay services 214(1)-M) may become aware of conditions that make it desirable to transition communication sessions to second one of the relay services 214(1)-(M). For example, the selected one of the relay services 214(1)-(M) may experience a power failure or be operating at or over capacity limits. In some implementations, when the selected one of the relay services 214(1)-(M) becomes aware of the conditions that makes it desirable to transition the communication channel, the selected one of the relay service 214(1)-(M) may provide a transition message to the device 202 and/or the device 206 to cause the device 202 and/or device 206 to connect to the second one of the relay services 214(1)-(M). In other implementations, the selected one of the relay services 214(1)-(M) may handle the handoff to the second one of the relay services 214(1)-(M), such that the device 202 and/or the device 206 need not be aware of the transition.

Figure 3:
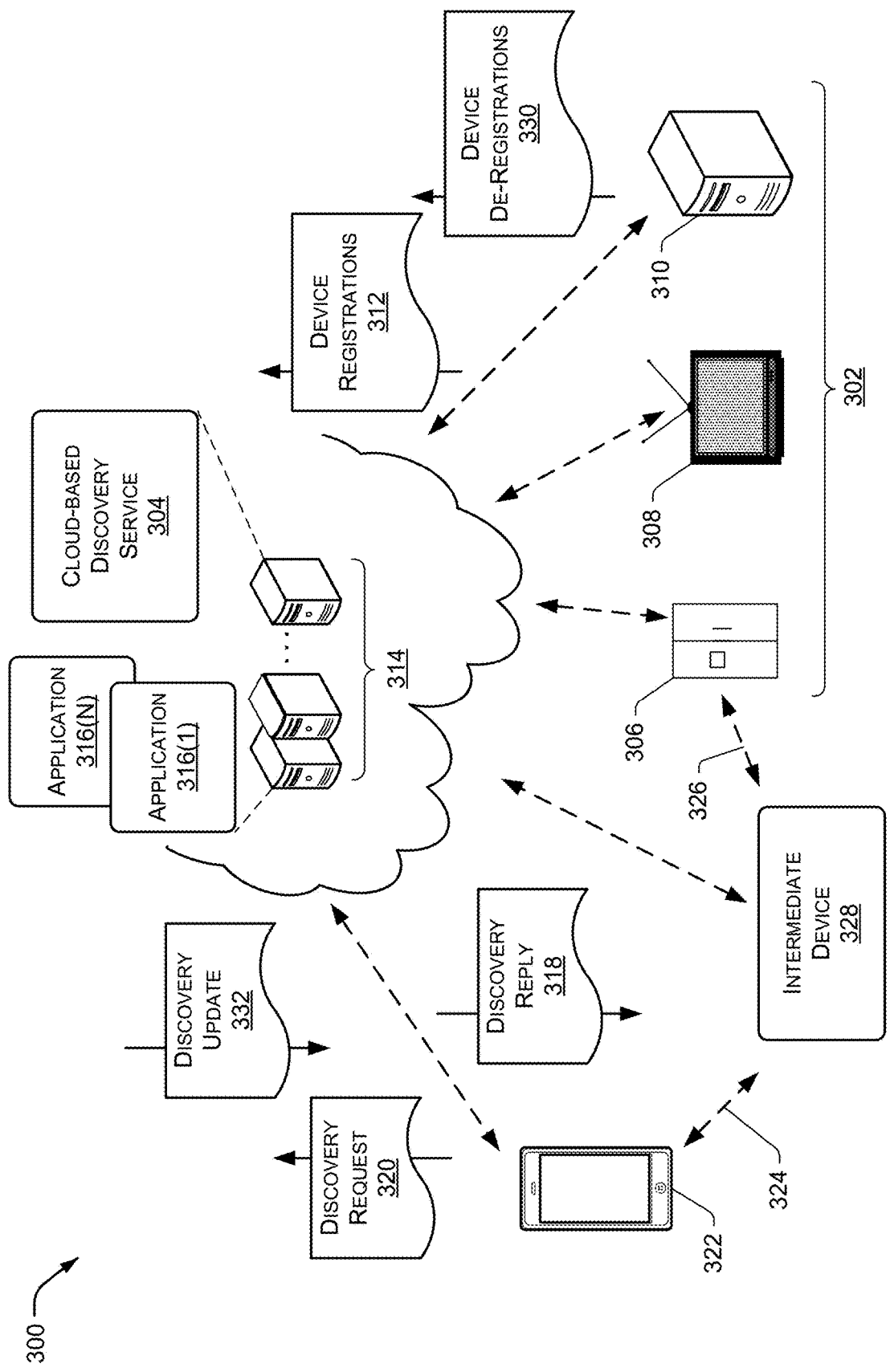
FIG. 3 illustrates an example system architecture including multiple devices registered with the cloud-based discovery service.

FIGS. 1 and 2 provide example environments and scenarios for utilizing the cloud-based discovery services. FIGS. 1-3 provide example system architectures for the cloud-based discovery service system.

FIG. 3 illustrates an example system architecture 300 including multiple devices 302 registered with the cloud-based discovery service 304. The devices 302 may include various types of devices, such as appliances 306, electronic devices 308, computing devices 310, among others. Each of the devices 302 includes one or more capability that may be utilized or accessed by another device belonging to a user. For instance, the devices 302 may include a television that has a larger or high definition display that may be utilized as an auxiliary or secondary display of a computing device.

Each of the devices 302 are configured to register with the cloud-based discovery service 304 when the device is available (e.g., when the device is turned on and/or awake). Each of the devices 302 registers with the cloud-based discovery service 304 by sending a device registration notification 312 to the cloud-based discovery service 304. The device registration notification 312 may include a device identifier (e.g., a user or manufacture assigned serial number or device name), the device capabilities (e.g., one or more applications or features of the device), and one or more endpoints (e.g., information for connecting to the device). In some examples, the devices 302 may be configured to provide state information with the device registration 312 or as a secondary notification. For instance, if the device 308 is active (i.e., turned on and in use), the device registration 312 provided by device 308 may include all or a majority of the capabilities of the device 308, while if the device 310 is idle (i.e., turned on but asleep), the device registration 312 provided by device 310 may include a limited set of the capabilities of the device 310, such as background applications that do not require the device to exit the sleep or idle mode in order to be accessed.

The device registrations 312 are received by the cloud-based discovery service 304, which is implemented on servers 314. As discussed above, the servers 314 may be owned by a single entity and collocated at a common data center or located at separate data centers. Alternatively, the servers 314 may be owned and operated by independent entities at separate locations. The servers 314 may be further arranged in any number of ways, such as server farms, stacks, and the like that are commonly used in data centers.

The cloud-based discovery service 304 also includes or has access to one or more applications 316(1)-(N). The applications 316(1)-(N) may be one or more cloud-based service that user or owner of devices 302 subscribes to or has access to. The services may be included by the cloud-based discovery service 304 as part of any discovery reply 318. For example, the applications 316(1)-(N) may include music or video streaming services, cloud-based data storage services, calendar services, electronic media content services, etc.

In general, a device 322 sends a discovery request 320 to the cloud-based discovery service 304 to which the devices 302 have previously registered. In response, the cloud-based discovery service 304 returns a discovery reply 318 including a list of the devices 302 and a sub-list for each of the devices 302 listing the capabilities associated with each device 302. In some cases, the list of devices may also include the applications 316(1)-(N) and a sub-list of the services associated with each application 316(1)-(N).

Once the discovery reply is received at the device 322, a user may select one or more of the devices and one or more of the capabilities. The user may also select an endpoint associated with the selected device and/or application. The device 322 may extract the endpoint information related to the selected endpoint from the discovery reply 318 and utilize the endpoint information to establish a connection to the selected device in order to utilize the selected device or application.

For instance, in the illustrated example, the device 322 has extracted endpoint information and established the communication channel indicated by 324 and 326 with the selected one of the devices 302 via an intermediate device 328. The intermediate device 328 may be a gateway, router, or other network device capable of relying data between electronic devices. By utilizing the local communication channel to access the selected capabilities but performing discovery via the cloud-based discovery service 304, the system 300 is able to reduce the overall bandwidth necessary for locating and connecting to remote devices and applications, as each of the devices 302 no longer broadcast discovery request or capabilities and connection transports.

In some cases, one of the devices 302 may be turned off or shut down. Before each of the devices 302 completely shuts down, the devices 302 generate a device de-registration notification 330 to the cloud-based discovery service 304. In some examples, the de-registration notification 330 causes the cloud-based discovery service 304 to remove the device and associated capabilities from the discovery service 304. In other examples, the de-registration notification 330 cause the cloud-based discovery service 304 to store information related to the de-registration of the device. For instance, the cloud-based discovery service 304 may update the list of devices, such that the device and the capabilities are still listed but are grayed out, un-selectable, or otherwise indicated as currently unavailable.

In some specific examples, the cloud-based discovery service 304 may notify the intermediate device 328 and/or the device 322 of the de-registered device. For instance, if the communication channel 324 is open and the communication channel 326 is interrupted due to one of the devices 302 shutting down, the cloud-based discovery service 304 may notify the intermediate device 328 or the device 322 of the status of the de-registered device, such that the intermediate device 328 or the device 322 may terminate the open communication channel 324.

In some particular implementations, one of the devices 302 may shut down before generating a de-registration notification 330. The intermediate device 328 may detect the disruption of the communication channel 326 and interpret the interruption as a de-registration notification 330. In this implementation, the intermediate device 328 may provide a de-registration notification 330 to the cloud-based discovery service 304 on behalf of the powered down device 302.

In some cases, the cloud-based discovery service 304 may be configured to provide discovery updates 332 to devices, such as device 322, following the discovery reply 318, in response to one or more of the devices or capabilities listed in the discovery reply de-registering from the cloud-based discovery service 304. For example, a discovery update notification 332 may include an indication of one or more of the devices 302 or applications 316(1)-(N) that have de-registered from the cloud-based discovery service 304 or an updated list of registered devices and applications meeting the criteria of the discovery request 320.

Figure 4:
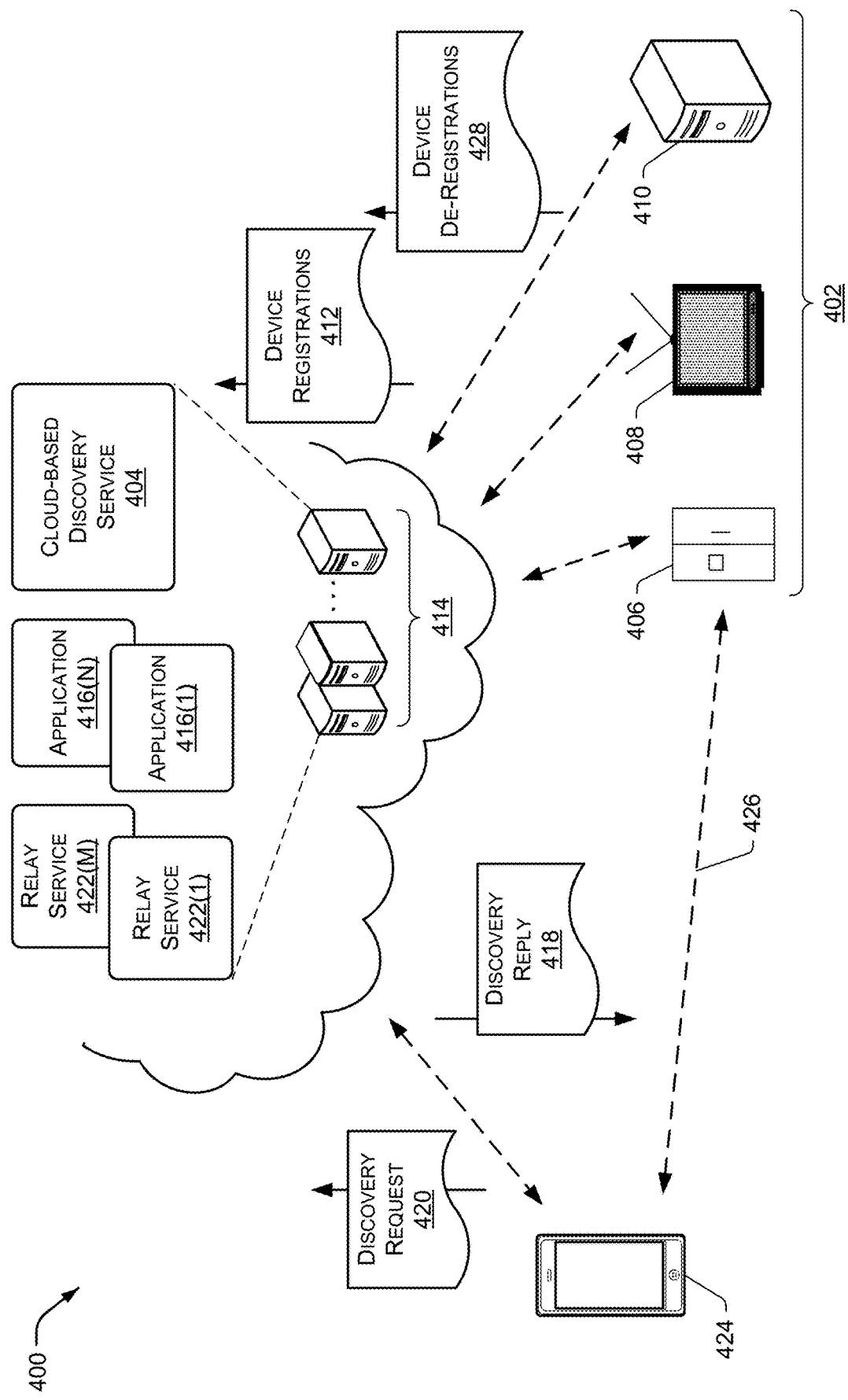
FIG. 4 illustrates an example system architecture including multiple devices registered with the cloud-based discovery service.

FIG. 4 illustrates an example system architecture 400 including multiple devices 402 registered with the cloud-based discovery service 404. The devices 402 may include various types of devices, such as appliances 406, electronic devices 408, computing devices 410, among others. Each of the devices 402 includes one or more capability that may be utilized or accessed by another device. For instance, the devices 402 may include a television that has a display that may be utilized as an auxiliary display of a computing device.

Each of the devices 402 are configured to register with the cloud-based discovery service 404 when the device is available (e.g., when the device is turned on and/or awake). Each of the devices 402 registers with the cloud-based discovery service 404 by sending a device registration notification 412 to the cloud-based discovery service 404. The device registration notification 412 may include a device identifier (e.g., a user or manufacture assigned name), the device capabilities (e.g., one or more applications or features of the device), and one or more endpoints (e.g., information for connecting to the device). In some examples, the devices 402 may be configured to provide state information with the device registration 412 or as part of a secondary notification following the device registration notification 412. For instance, if the device 408 is active (i.e., turned on and in use), the device registration 412 provided by device 408 may include all or a majority of the capabilities of the device 408, while if the device 410 is idle (i.e., turned on but asleep), the device registration 412 provided by device 410 may include a limited set of the capabilities of the device 310, such as background applications which do not require the device to exit the sleep or idle mode in order to be accessed.

The device registrations 412 are received by the cloud-based discovery service 404, which is implemented on servers 414. As discussed above, the servers 414 may be owned by a single entity and collocated at a common data center or located at separate data centers. Alternatively, the servers 314 may be owned and operated by independent entities at separate locations. The servers 314 may be further arranged in any number of ways, such as server farms, stacks, and the like that are commonly used in data centers.

The cloud-based discovery service 404 also includes or has access to one or more applications 416(1)-(N). The applications 316(1)-(N) may be one or more cloud-based service that user or owner of devices 402 subscribes to or has access to via an account. The services may be included by the cloud-based discovery service 404 as part of any discovery reply 418 to a discovery request 420. For example, the applications 416(1)-(N) may include music or video streaming services, cloud-based data storage services, calendar services, electronic media content services, etc.

The servers 414 may also host one or more cloud-based relay services 422(1)-(M). The relay services 422(1)-(M) may be configured to provide an alternative endpoint to a device-to-device or local connection between the devices 402. For example, if the devices 402 are not proximal to each other and a direct device-to-device connection or a local area network connection is unavailable, the devices may still establish a communication channel using one or more of the relay services 422(1)-(M).

In general, a device 424 sends a discovery request 420 to the cloud-based discovery service 404 to which the devices 402 have previously registered. In response, the cloud-based discovery service 404 returns a discovery reply 418 including a list of the devices 402 and a sub-list for each device including the capabilities associated each device. In some cases, the list of devices may also include the applications 416(1)-(N) and services associated with each of the applications 416(1)-(M).

Once the discovery reply is received at the device 424, a user may select one or more of the devices 402 or applications 416(1)-(M) and one or more of the capabilities and/or services associated with each. The user may also select an endpoint associated with the selected device and/or application. The device 424 may be configured to extract the endpoint information related to the selected endpoint from the discovery reply 418 and utilizes the endpoint information to establish a connection to the selected device or application.

For instance, in the illustrated example, the device 424 has extracted endpoint information and established a direct device-to-device communication channel, generally indicated by 426. In an alternative example, the user may select and the device 424 may extract endpoint information related to one or more of the cloud-based relay services 422(1)-(M). In this example, the device 424 no longer needs to be local to the devices 302 in order to connect. Rather, the device 424 may be distant, out of range, or remote from the devices 402 but still able to connect and utilize the capabilities associated with each of the devices 402.

In some specific examples, the type of connected may transition between the direct device-to-device communication channel 426 and via one or more of the relay services 422(1)-(M). For instance, if the connection was established via the relay services 422(1)-(M) and the device 424 requires an increased data transfer rate which the relay service 422(1)-(M) may be unable to achieve (for instance, due to network latency), the relay service 422(1)-(M) or the device 424 may cause the connection to transition to the direct device-to-device communication channel 426. In this way the communication channel established using the cloud-based discovery service 404, may transition in order to continue to meet the requirements of the device 424, as the requirements change.

In some cases, one of the devices 402 may be turned offered or shut down. Before each of the devices 402 completely shut down, the devices 402 generates device de-registration notifications 428 and provide the device de-registrations 428 to the cloud-based discovery service 404. The de-registration notification 428 causes the cloud-based discovery service 404 to remove the device and associated capabilities from the list of registered devices.

Figure 5:
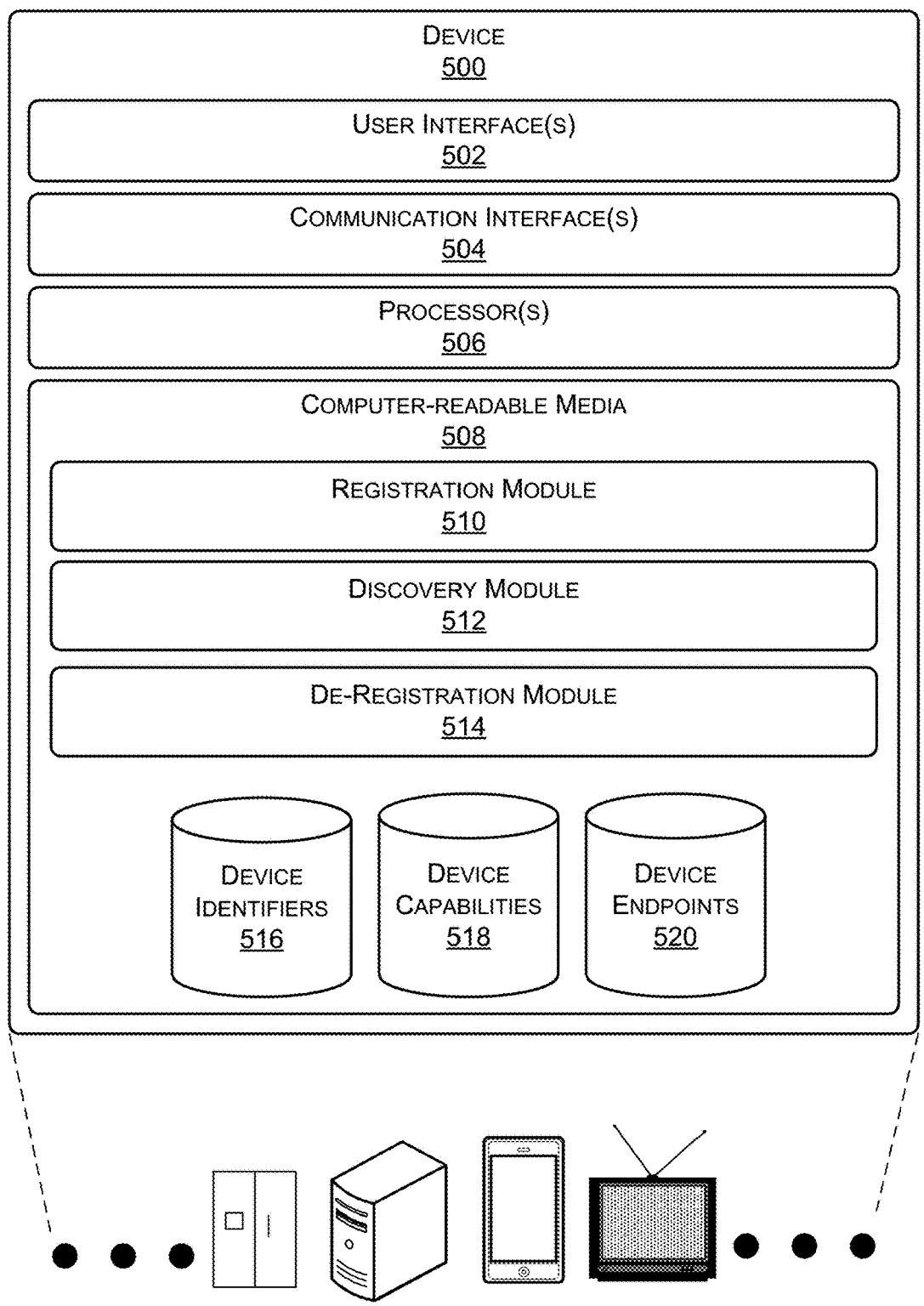
FIG. 5 illustrates an example architecture of a device configured to utilize could-based discovery services.

FIG. 5 illustrates an example architecture of a device 500 configured to utilize could-based discovery services. Generally, the device 500 may be implemented as any type of electronic device capable of communicating over one or more networks. For example, the device 500 may include appliances (e.g., smart refrigerators, ovens, etc.), electronic devices (e.g., televisions, radios, etc.), computing devices (e.g., desktop computers, tablet computers, notebook computers, cellular or smart phones, etc.).

The device 500, generally, includes one or more user interfaces 502 for presenting information or data and for receiving user inputs. The user interfaces 502 may include one or more output components, such as a display or touch screen, and one or more input components, such as keyboards, keypads, joysticks, a mouse, a touch screen, touch pad, drawing pad, or control buttons, as well as one or more output components, such as a display. In some implementations, the output components and input components are combined in a single user interface 502 capable of presenting information or data and receiving user inputs. In some particular implementations, the user interfaces 502 may include image processing components and/or audio processing components for receiving gestural inputs and verbal/audio inputs.

The device 500 also includes one or more communication interfaces 504 to facilitate communication between one or more networks (such as the Internet® or one or more local area networks), directly with one or more devices, and/or with one or more cloud services (such as the cloud-based discovery service and/or the cloud-based relay service). The communication interfaces 504 may also facilitate communication between one or more wireless access points, a master device, and/or one or more other computing devices as part of an ad-hoc or home network system. The communication interfaces 504 may support both wired and wireless connection to various networks, such as cellular networks, radio, WiFi networks, short-range or near-field networks (e.g., Bluetooth®), infrared signals, local area networks, wide area networks, the Internet, and so forth.

The device 500 includes or accesses components such as at least one or more control logic circuits, central processing units, or processors 506, and one or more computer-readable media 508 to perform the function of the device 500. Additionally, each of the processors 506 may itself comprise one or more processors or processing cores.

Depending on the configuration of the device 500, the computer-readable media 508 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 506.

Several modules such as instruction, data stores, and so forth may be stored within the computer-readable media 508 and configured to execute on the processors 506. For instance, the registration module 510 is configured to generate and provide the device registration notification to the cloud-based discovery service, the discovery module 512 is configure to generate and provide discovery requests to the cloud-based discovery service, and the de-registration module 514 is configured to generate and provide the device de-registration notification to the cloud-based discovery service. The computer-readable media 508 may also store data and/or information. For instance, in the illustrated example, the computer-readable media 508 stores device identifiers 516 or device information, device capabilities 518, and device endpoints 520.

Generally, when the device 500 is turned on, activated, or awakened from a low power, idle, or sleep state, the registration module 510 is executed by the processors 506. In this way, the device registration is preformed automatically, however in other implementations, the registration module 510 may execute in response to a user input. The registration module 510 causes the device 500 to generate a device registration notification including the device identifier 516, a list of the device capabilities 518 available for access via the cloud-based discovery service, and a list of device endpoints 520 through which the device 500 may be accessed. Once the device registration is generated, the device 500 provides the registration notification to the cloud-based discovery service via one or more of the communication interfaces 504.

Alternatively, when the device 500 is turned off, deactivated, or enters a low power, idle, or sleep state, the de-registration module 514 510 is executed by the processors 506. In this way, the device de-registration may be preformed automatically. However in other implementations, the de-registration module 514 may execute in response to a user input, for instance, if the user desires to place the device 500 in a do not disturb state. Generally, the de-registration module 510 causes the device 500 to generate a device de-registration notification and provide the de-registration notification to the cloud-based discovery service via one or more of the communication interfaces 504. In some implementations, the de-registration notification generated by the de-registration module 514 may include a limited set of the device capabilities 518. For example, if the device 500 is placed in a sleep or idle state some of the device capabilities 518 may still be available for use by other devices, such as background operation that may be performed without removing the device 500 from the sleep state.

The discovery module 512 may be executed in response to a user input to perform device discovery at the user interfaces 502. In general, the discovery module 512 when executed, cause the device 500 to generate and provide a discovery request to the cloud-based discovery service. The discovery request may be a request for a list of devices and/or applications available through the cloud-based discovery service, a request for a list of devices with specific capabilities or application with specific services, or a list of devices associated with a household or a user account.

In response to providing the discovery request, the device 500 receives a discovery reply from the cloud-based discovery service. The discovery reply includes a list of devices and associated capabilities that meet the criteria of the discovery request. The discovery module 512 may cause the processor 506 to display or present the list of devices and associated capabilities. The user may then select one or more of the devices and/or capabilities from the list using the user interfaces 502. The discovery module 512 may also cause the endpoint information for each device to be presented to the user via user interfaces 502, such that the user may select a desired endpoint for connecting to the selected device.

Once the device and endpoint are selected, the discovery module 512 may extract the endpoint information associated with the selected device and selected endpoint and carry out operations to establish a communication channel with the selected device according to the extracted information. For instance, the discovery module 512 may contact one or more cloud-based relay services in order to establish a connection with the selected device.

Figure 6:
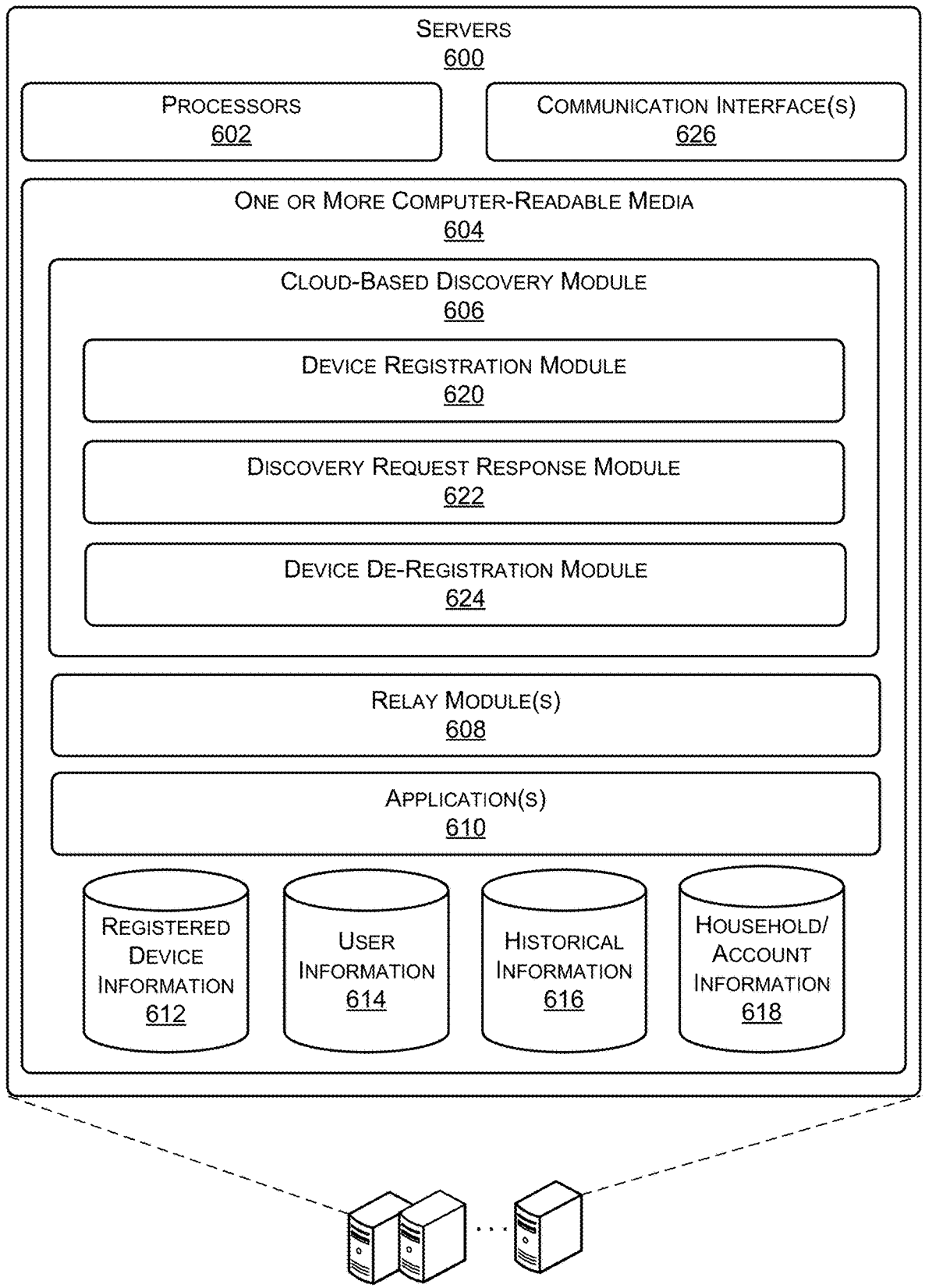
FIG. 6 illustrates an example architecture of one or more servers configured to implement could-based discovery services.

FIG. 5 provides an example architecture of a device located configured to utilize could-based device discovery. FIG. 6 provides example architecture of one or more servers implementing the cloud-based discovery service.

FIG. 6 illustrates an example architecture of one or more servers 600 configured to implement could-based discovery services. In general, servers 600, which host the cloud-based discovery service, the cloud-based relay services, and/or one or more applications collectively comprise processing resources, as represented by processors 602, and computer-readable storage media 604. The computer-readable storage media 604 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may be stored within the computer-readable media 604 and configured to execute on the processors 602. For example, a cloud-based discovery module 606 may be provided to implement the cloud-based discovery services of FIGS. 1-4, one or more cloud-based relay module(s) 608 may be provided as endpoint options for connecting two or more devices, and one or more applications 610 may be provided to supplement the available capabilities of the registered devices. Various other modules may also be stored on computer-readable storage media 604.

The computer-readable media 604 may also store data usable by the cloud-based discovery module 606, the relay modules 608, and/or the application 610. For example, the computer-readable media 604 may store registered device information 612 (e.g., device identifies, device capabilities, and/or device endpoint information), user information 614 (e.g., authentication credentials, permissions, subscription information, logon credentials, settings, preferences, lists/indexes related to devices, applications, or online services, and/or other personal information), historical information 616 (e.g., device ranking information such as which devices are most commonly selected for a given capability by a particular user or requesting device), and/or household/account information 618 (e.g., which devices and/or application belong to which household, home, user group, user accounts, etc.)

The cloud-based discovery module 606 also includes various modules, such as device registration module 620, discovery request response module 622, and device de-registration module 624. The registration module 620 may be configured to receive device registration notifications, extract the device and endpoint information from the registration notification, and to add the device to the register device information 612. The discovery request response module 622 may be configured to generate a list of devices, applications, capabilities, services, or a combination thereof based on criteria provided in a discovery request and to provide the lists to the requesting device as a discovery reply. The device de-registration module 624 may be configured to receive device de-registration notifications and to remove the associated information from the registered device information 612.

The servers 600 also include one or more communication interfaces 626 for communicating with the devices of the cloud-based discovery system. The communication interfaces 626 may support both wired and wireless connection to various networks, such as cellular networks, radio, WiFi networks, short-range or near-field networks (e.g., Bluetooth®), infrared signals, local area networks, wide area networks, the Internet, and so forth.

For example, the cloud-based discovery module 606 of the servers 600 may receive a device registration notification from a registering device. Upon receipt of the device registration notification, the processors 602 execute the device registration module 620. The device registration module 620 parses the device registration notification to identify the device identifier, the device capabilities, and the endpoint information associated with the reregistering device. The device registration module 620 may store the device identifier, the device capabilities, and the endpoint information as registered device information 612 for use by the discovery request response module 622 in responding to discovery requests.

The device registration module 620 may also group the registering device into one or more access groups. For instance, the device registration module 620 may access the user information 614 and/or the household/account information 618 to determine which users, devices, households, and/or accounts should have access to the registering device and the registering devices capabilities. For example, the registering device may be a family computing device (e.g., a desktop computer) and by accessing the household/account information 618, the device registration module 620 may determine that four members of a particular household are authorized to use the computing device and allow other devices associated with any of the four household members to access the registering device via a discovery request.

In another example, the cloud-based discovery module 606 of the servers 600 may receive a device de-registration notification from a previously registered device. Upon receipt of the device de-registration notification, the processors 602 execute the device de-registration module 624. The device de-registration module 624 is configured to access the registered device information 612 and to remove the device identifier, the device capabilities and/or services, and the endpoint information associated with the de-registering device. In some implementations, the device de-registration module 624 may also provide a notification to devices known to have a currently active communication channel with the de-registering device, such that the devices may terminate the communication channel.

In another example, the cloud-based discovery module 606 of the servers 600 may receive a discovery request from a device. Upon receipt of the discovery request, the processors 602 execute the discovery request response module 622. The discovery request response module 622 is configured to parse the discovery request to identify any criteria the device or a user of the device may have imposed on a discovery reply. For instance, the discovery request may be a request for devices with a display larger than 35 inches.

Once the criteria is determined, the discovery request response module 622 access the registered device information 612 to identify devices with capabilities and/or services that meet the criteria to generate a discovery reply. In some cases, the discovery request response module 622 may also identify one or more of the applications 610 that meet the criteria and include the applications 610 in the discovery reply.

The discovery request response module 622 may also access the user information 614 and the household/account information 618 to identify registered devices that may be returned or accessed by the device providing the discovery request. In some implementations, the discovery request response module 622 may also rank or order the identified devices in the discovery reply, such that the highest ranking device may be displayed to the user first. For example, the discovery request response module 622 may access the historical information 616 to determine the most commonly selected device and/or capability when a discovery request has the identified criteria or when the discovery request is from a specific user or specific device.

In some implementations, the discovery request response module 622 may also utilize location information or global position system (GPS) information provided by or known about the registered device to select or identify one or more of the devices. For example, the discovery request response module 622 may select or identify devices within 100 meters of the device providing the discovery request or devices within a maximum range associated with establishing a device-to-device connection.

In some specific implementations, the location information may be obtained by using a network fingerprint. For example, is some systems, each device is able to create or generate a network fingerprint that identifies one or more networks in the vicinity of the device. For example, the network fingerprint may include for nearby devices (such as a router or other computing device) an internet protocol (IP) address, a default gateway media access control (MAC) address, a wireless basic service set identifier (BSSID), or a common route prefix, among others. Each registering device may then provide or deposit the network fingerprint with the servers 600 implementing the cloud-based discovery services 606, such that the discovery request response module 622 may generate the discovery reply to include registered devices with matching fingerprints to the device providing the discovery request.

Once the devices are identified and ordered, the discovery request response module 622 provides the discovery reply back to the requesting device. The discovery reply includes the devices identifies and device capabilities meeting the criteria, as well as endpoint information for accessing the identified devices. In some instances, the endpoint information may include information related to the relay module 608 for establishing a communication channel with one or more of the identified devices via the servers 600.

Figure 7:
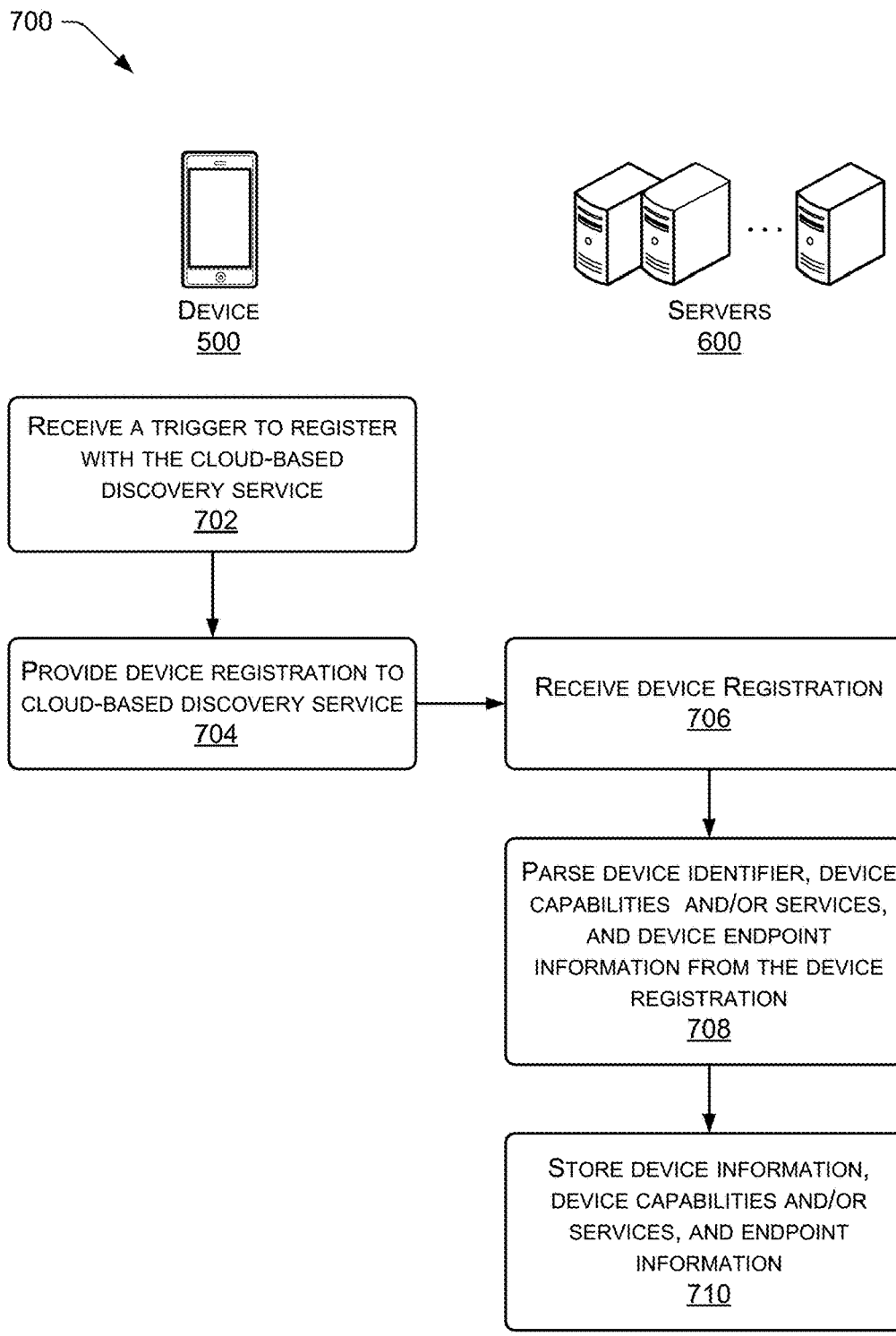
FIG. 7 is an example flow diagram showing an illustrative process to register a device with the cloud-based discovery service.
Figure 8:
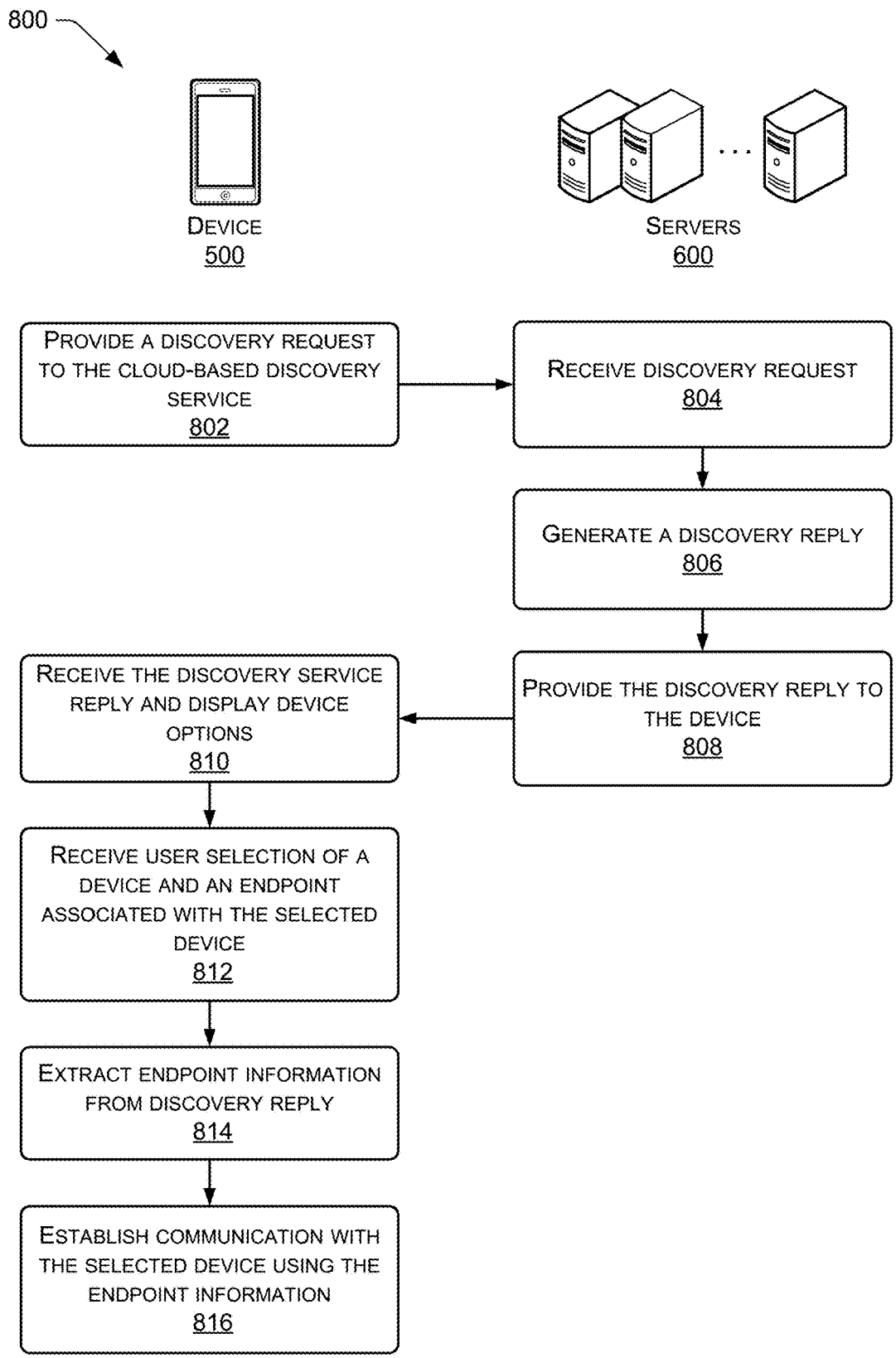
FIG. 8 is an example flow diagram showing an illustrative process 800 to perform cloud-based device discovery.
Figure 9:
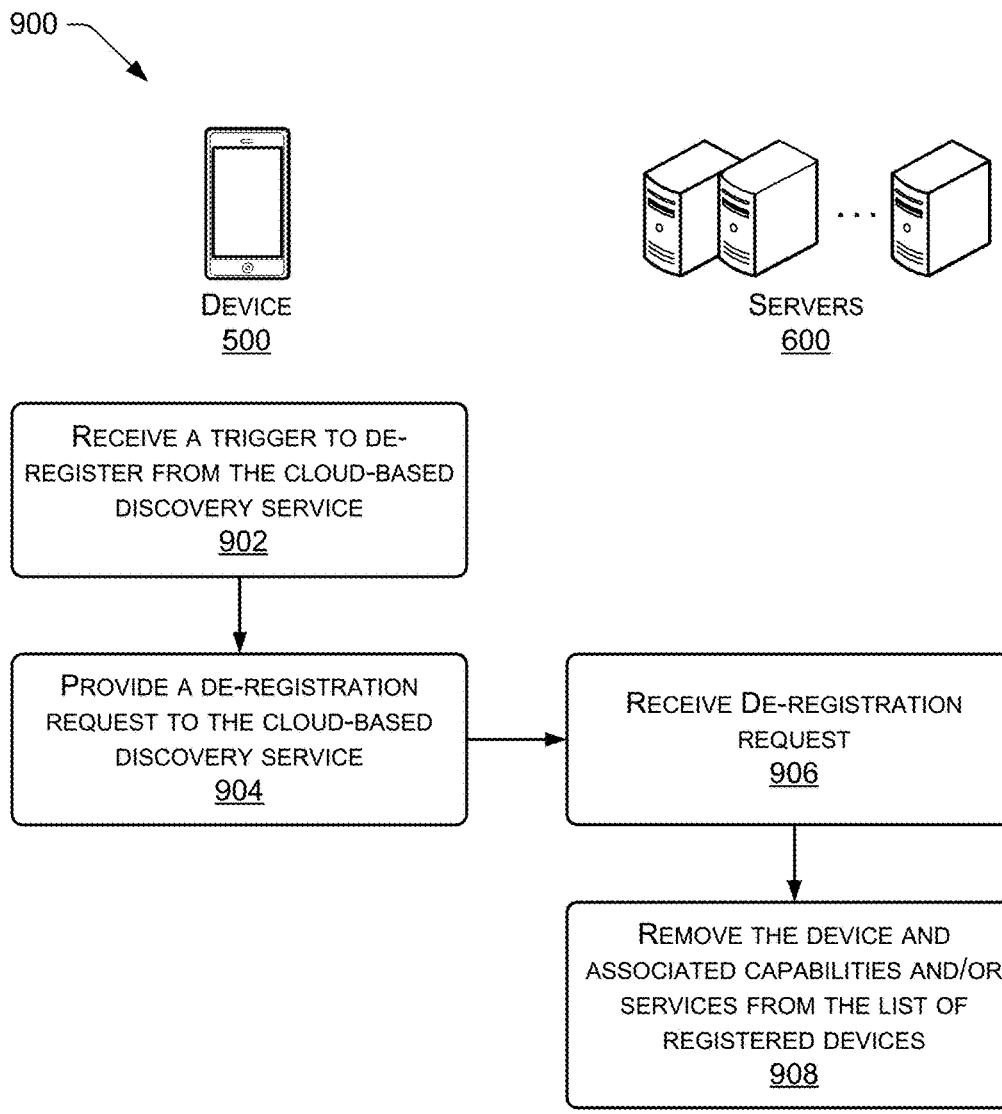
FIG. 9 is an example flow diagram showing an illustrative process to de-register a device with the cloud-based discovery service.

FIGS. 7-9 are a flow diagram illustrating example processes for implementing cloud-based discovery services. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 7 is an example flow diagram showing an illustrative process 700 to register a device 500 with the cloud-based discovery service implemented on the servers 600. At 702, the device 500 receives a trigger to register with the cloud-based discovery service. The trigger may be in response from a change in state of the device 500 or in response to a user input. For example, the device 500 may be configured to send a device registration notification as part of an initialization sequence the device performs when activated or awakened from a sleep state. In other examples, the device 500 may be configured to register with the cloud-based discovery services in response to the user providing an express input to register.

At 704, the device 500 provides the device registration to the cloud-based discovery service. As discussed above, the device registration includes device identifies, device capabilities, and at least one endpoint for connecting to the device. In some implementations, the device capabilities may be a limited set of capabilities. For instance, in some examples, the user may select which capabilities he/she desires to make available via the cloud-based discovery service and, in some cases, which capabilities are not to be made available via the cloud-based discovery services. In other examples, the set of capabilities may be based on a state of the device 500. For instance, if the device 500 is in a low power mode, the device 500 may allow access to background operations via the cloud-based discovery service but prevent access to any capability that requires the device 500 to exit the low power state.

At 706, the cloud-based discovery service receives the device registration from the device 500 and, at 708, the cloud-based discovery service parses the device identifier, the device capabilities, and the device endpoint information from the device registration. In some implementations, the cloud-based discovery service may also access user information and/or household/account information in order to group or determine permissions associated with the device 500.

At 710, the cloud-based discovery service stores the device information, device capabilities, and endpoint information. Thus, making the device and the capabilities available for discovery with the cloud-based discovery service and completing the registration process.

FIG. 8 is an example flow diagram showing an illustrative process 800 to perform cloud-based device discovery. At 802, a device 500 provides a discovery request to a cloud-based discovery service implemented on the servers 600 and, at 804, the cloud-based discovery service receives the discovery request from the device 500. The discovery request may be a request for a list of devices, applications, capabilities and/or services available through the cloud-based discovery service, a request for a list of devices with a specific capabilities or services, or a list of devices or applications available in the household or associated with a user account.

At 806, the cloud-based discovery service generates a discovery service reply. In general, the discovery reply includes a list of devices and/or applications and a sub-list for each device or application including the capabilities and/or services provided by each of the devices or applications. In some implementations, the discovery request include criteria associated with the request capability or service and the cloud-based discovery service may be configured to generate the discovery reply by selecting or identifying one or more devices and/or applications that include the capabilities and/or services that meet the criteria set forth in the discovery request.

At 808, the cloud-based discovery service provides the discovery reply to the device 500 and, at 810, the device 500 receives the discovery reply and displays the device options. For example, the device 500 may display the list of devices and/or applications that meet the criteria provided in the discovery request, such that the user may select a desired device. In some cases, the device 500 may also display the sub-list of capabilities under each of the listed devices, such that the user is able is able to select the device based on both the device identifier and the device capabilities.

At 812, the device 500 receives a user selection of a device and an endpoint associated with the selected device. For example, the user may be able to select between a device-to-device connection, a connection over a local area network, and/or a connection via one or more cloud-based relay services.

At 814, the device 500 extract endpoint information from the discovery reply and at 816, the device 500 establishes a communication channel with the selected device using the endpoint information. Once the communication channel is established, the device 500 may utilize the capability of the selected device. For example, the device 500 may utilize a display of a television as a secondary or auxiliary display for the device 500.

In some implementations, to cloud-based discovery service may assist in establishing the communication channel with the selected device. The device 500 may provide a notification to the cloud-based discovery service indicating the selected device and endpoint and the cloud-based discovery service may then contact or notify the selected device that the device 500 desires to establish a communication channel. For example, the device 500 may notify the cloud-based discovery service that the device 500 desires to establish a device-to-device connection with the selected device. The cloud-based discovery service may then notify the selected device that the device 500 desires to form a device-to-device connection. In this manner, both the selected device and the device 500 are able to enter a state or mode in which the direct communication channel may be established.

FIG. 9 is an example flow diagram showing an illustrative process 900 to de-register a device 500 with the cloud-based discovery service implemented by the servers 600. At 902, the device 500 receives a trigger to de-register from the cloud-based discovery service. The trigger may be in response from a change in state of the device 500 or in response to a user input. For example, the device 500 may be configured to send a device de-registration notification as part of a shut down sequence performs when deactivated or entering a low power or sleep state. The device 500 also may be configured to de-register with the cloud-based discovery services in response to the user providing an express input to do so, for example, when the user desires to place the device 500 in a do not disturb state.

In one particular example, the de-registration request may be generated by a local communication service, such as a router or gateway, rather than the device 500 itself. For instance, the local communication service may detect an interruption or disruption of the communication channel with the device 500. The local communication service may be configured to interpret the interruption or disruption as an indication that the device 500 is no longer available and to provide the de-registration request to the cloud-based discovery service in response.

At 904, the device 500 provides a de-registration request to the cloud-based discovery service. The de-registration request may be a request to remove the device 500 from the list of registered devices or a request to remove some subset of the capabilities from the capabilities associated with the device 500. For example, if the device 500 is shutting down the de-registration request may indicate that the device 050 should be removed from the list of registered devices. However, if the device 500 is entering a low power mode, the de-registration request may indicate that the capabilities that require the device 500 to be in an active state are no longer available but that other capabilities that may be performed by the device 500 in the lower power state may remain.

At 906, servers 600 implementing the cloud-based discovery service receives the de-registration request and, at 908, the cloud-based discovery service removes the device 500 and associated capabilities and/or services from the list of registered devices. In some cases, the cloud-based discovery service may record the state of the device 500 rather than removing the device 500 completely. For example, the cloud-based discovery service may mark the device as unavailable but keep a record of the device 500 and associated capacities and/or services in memory to reduce overhead of constantly registering and de-registering devices.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device comprising:
    one or more communication interfaces to communicate with a system that is remote from the device;
    one or more processors; and
    non-transitory computer-readable storage media storing computer-executable instructions, which when executed by the one or more processors cause the one or more processors to:
        send, to the system, request data for information associated with one or more devices that satisfy a criterion, the system configured to access the information;
        receive reply data from the system, the reply data including a device identifier of an audio-output device and endpoint information related to an endpoint for connecting to the audio-output device, the audio-output device including at least one speaker; and
        use the endpoint information to connect to the audio-output device.

2. The device as recited in claim 1, wherein
    the using the endpoint information to connect to the audio-output device comprises using the endpoint information to connect to the audio-output device over a short-range network.

3. The device as recited in claim 1, wherein
    the using the endpoint information to connect to the audio-output device comprises using the endpoint information to connect to the audio-output device via Bluetooth.

4. The device as recited in claim 1, wherein the device is associated with user account data and the audio-output device is associated with the user account data.

5. The device as recited in claim 1, wherein the request data includes a device identifier of the device, and the system is configured to use the device identifier to identify account data associated with the device and with the audio-output device.

6. The device as recited in claim 1, wherein the computer-readable storage media further stores computer-executable instructions, which when executed by the one or more processors cause the one or more processors to:
    determine that the device has transitioned from a first device state to a second device state; and
    send, to the system and at least partly in response to determining that the device has transitioned from the first device state to the second device state, registration data for registering the device with the system.

7. The device as recited in claim 1, wherein the computer-readable storage media further stores computer-executable instructions, which when executed by the one or more processors cause the one or more processors to:
    receive an indication of user input; and
    send, to the system and at least partly in response to receiving the indication, registration data for registering the device with the system.

8. The device as recited in claim 7, wherein the computer-readable storage media further stores computer-executable instructions, which when executed by the one or more processors cause the one or more processors to send, to the system and as part of an initialization sequence of the device, registration data for registering the device with the system.

9. The device as recited in claim 1, wherein the request data comprises first request data, and the computer-readable storage media further stores computer-executable instructions, which when executed by the one or more processors cause the one or more processors to:
    receive an indication of user input; and
    send, to the system and at least partly in response to receiving the indication, second request data to deregister the device with the system.

10. The device as recited in claim 1, wherein the request data comprises first request data, and the computer-readable storage media further stores computer-executable instructions, which when executed by the one or more processors cause the one or more processors to:
    determine that the device has transitioned from a first device state to a second device state; and
    send, to the system and at least partly in response to determining that the device has transitioned from the first device state to the second device state, second request data to deregister the device with the system.

11. The device as recited in claim 1, wherein the computer-readable storage media further stores computer-executable instructions, which when executed by the one or more processors cause the one or more processors to determine that a user of the device is an authorized user of the audio-output device.

12. The device as recited in claim 1, wherein the reply data includes an indication of one or more capabilities associated with the audio-output device.

13. The device as recited in claim 1, wherein the system comprises a first system, and the computer-readable storage media further stores computer-executable instructions, which when executed by the one or more processors cause the one or more processors to:
- receive notification data to transition the device from connecting to the audio-output device via a second system to connecting to the audio-output device via a third system;
- cause the device to disconnect from the second system; and
- cause the device to connect to the audio-output device via the third system.

14. The device as recited in claim 1, wherein the computer-readable storage media further stores computer-executable instructions, which when executed by the one or more processors cause the one or more processors to:
- receive user input to initiate device discovery; and
- at least partly in response to receiving the user input, generate the request data.

15. A method comprising:
- receiving request data from a first device for information corresponding to one or more devices satisfying one or more criteria;
- identifying, from a list of devices, a second device that satisfies the one or more criteria, the second device including at least one speaker and being configured to output audio;
- sending, to the first device, an identifier of the second device; and
- sending, to the first device, information related to an endpoint associated with the second device.

16. The method as recited in claim 15, wherein the first device comprises a desktop computer and the first device and the second device are associated with a common user account.

17. The method as recited in claim 15, wherein the request data comprises first request data, and further comprising:
- receiving second request data to deregister a third device; and
- removing, from the list of devices, identifying information associated with the third device.

18. The method as recited in claim 15, wherein the request data comprises first request data, and further comprising:
- receiving, from the first device, second request data to register the first device in the list of devices; and
- adding, to the list of devices, identifying information associated with the first device.

19. A method comprising:
- sending, to a system, request data for information associated with one or more devices that satisfy a criterion, the system configured to access the information,
- receiving reply data from the system, the reply data including a device identifier of an audio-output device and endpoint information related to an endpoint for connecting to the audio-output device, the audio-output device including at least one speaker; and
- using the endpoint information to connect to the audio-output device.

20. The method as recited in claim 19, wherein the using the endpoint information to connect to the audio-output device comprises using the endpoint information to connect to the audio-output device over a short-range network.

* * * * *